United States Patent [19]

Miyatuka

[11] 3,794,717

[45] Feb. 26, 1974

[54] METHOD OF PREPARING COMPOUND OXIDES OF TITANIUM AND ZINC

[75] Inventor: Hajime Miyatuka, Saitama, Japan

[73] Assignee: Fuji Photo Film Co., Ltd., Kanagawa, Japan

[22] Filed: Mar. 22, 1972

[21] Appl. No.: 236,966

[30] Foreign Application Priority Data
Mar. 26, 1971 Japan.............................. 46-18121

[52] U.S. Cl. .............................................. 423/598
[51] Int. Cl............................................ C01g 23/00
[58] Field of Search...................................... 423/598

[56] References Cited
UNITED STATES PATENTS

| | | | |
|---|---|---|---|
| 3,413,083 | 11/1968 | Daendliken........................ | 423/598 |
| 3,331,659 | 7/1967 | Malloy................................ | 423/598 |
| 3,361,519 | 1/1968 | Aykan................................. | 423/598 |

OTHER PUBLICATIONS

Flasehem "Journal of The American Chemical Society," Vol. 77, 1954, p. 6194.

Primary Examiner—Herbert T. Carter
Attorney, Agent, or Firm—Sughrue, Rothwell, Mion, Zinn & Macpeak

[57] ABSTRACT

A method of preparing compound oxides of titanium and zinc is improved. It comprises subjecting a mixed fine powder of zinc oxide and oxides of titanium obtained from a titanic acid ester to heat treatment at temperatures not lower than 600°C.

8 Claims, No Drawings

METHOD OF PREPARING COMPOUND OXIDES OF TITANIUM AND ZINC

BACKGROUND OF THE INVENTION

1. Field of the Invention

This invention relates to a method of preparing compound oxides of titanium and zinc.

2. Description of the Prior Art

It is known in the art that various compound oxides can be prepared from titanium oxide and zinc oxide by means of a solid phase reaction. Among those compound oxides of titanium and zinc, the compound oxide, zinc orthotitanate ($Zn_2TiO_4$), having a titanium oxide - zinc oxide ratio of 1 : 2 is easiest to prepare. Other examples of such compound oxides include zinc metatitanate ($ZnTiO_3$) having a titanium oxide — zinc oxide ratio of 1 : 1 and $Zn_2Ti_3O_8$ having a ratio of 1 : 1.

Known methods for preparing such compound oxides are, for example, a method in which titanium oxide and zinc oxide are reacted in the form of a powder mixture by subjecting the reactants to heat-treatment at high temperature, a method in which a compound of titanium or zinc is decomposed by heating and, concurrently therewith, subjected to a solid phase reaction, and a method in which a mixture of titanium oxide sol and zinc oxide is subjected to heat treatment (at temperature higher than 500°C) to carry out a solid phase reaction.

The method in which a powder mixture of titanium oxide and zinc oxide is subjected to a solid phase reaction is accompanied by the disadvantage of poor reactivity. Therefore, a considerably long period of time is required in order to complete the reaction and, in some cases, a compression moulding of the powder is necessary.

When the solid phase reaction is accompanied by the pyrolysis of a zinc or titanium compound, the reactivity is considerably enhanced in comparison with the case in which the reaction is effected using the reactants both in the form of powder. Furthermore, when the reaction is carried out using titania sol, the reactivity can be even more enhanced and the compound oxide can be obtained more easily than by either of the foregoing two methods.

In some cases, the solid phase reaction is carried out after compression moulding of the starting reactants, in order to facilitate the reaction and to produce the compound oxide efficiently.

Thus far the reported examples of methods to produce compound oxides are almost all based on laboratory experiments, in which the amount of the starting materials used is small and heat is sufficiently and uniformly provided throughout the powder layer. However, when a fairly large amount of the starting materials are used, it is extremely difficult to produce the compound oxide efficiently even by stirring the layer of powder reactants sufficiently. Accordingly, at present there are no effective methods to obtain the compound oxides in a considerably large amount.

Furthermore, when a compound of titanium or zinc is used, there is the disadvantage that it is difficult to obtain pure products, for example, due to contamination by by-products upon pyrrolysis, although the reactivity can be greatly enhanced in comparison with effecting the reaction using the two oxides both in the form of a powder.

The kinds of the resulting compound oxides considerably vary with the titanium-to-zinc ratio in the starting materials and with the reaction temperature.

It is known that $ZnTiO_3$ is formed at a temperature ranging from 600° to 700°C, and when the temperature exceeds 900°C, thermal decomposition takes place to form $Zn_2TiO_4$. It is also known that $Zn_2TiO_4$ is formed at higher temperature than is used for $ZnTiO_3$ production, i.e. 700° – 900°C, and that this compound oxide is stable and undergoes no thermal decomposition when heated to 900°C or higher. $Zn_2Ti_3O_8$ is obtained with considerable difficulty, is unstable and is formed along with other compound oxides. Therefore, it is quite difficult to isolate this compound oxide in its pure form. In general, when the solid phase reaction is effected at a temperature less than 1,000°C, the resulting product consists of three kinds of compound oxides, zinc oxide and titanium oxide, so that it is very difficult to obtain a single kind of compound oxide. When the solid phase reaction is effected at a temperature higher than 1,000°C, $Zn_2Ti_3O_8$ can be obtained in its pure and stable form by suitably selecting the titanium-to-zinc ratio.

However, in either case, the compound oxides can be obtained in a considerable yield only when the reactant oxides are used in a relatively small amount and heat can be uniformly transferred throughout the reactants.

An object of the present invention is to provide a method for producing compound oxides of titanium and zinc, whereby the products can be obtained at lower temperatures than in prior art methods.

Another object of the present invention is to provide a method whereby a larger amount of the compound oxides of titanium and zinc can be obtained at one time, in comparison with prior art methods.

A further object of the present invention is to provide a method for preparing the compound oxides of titanium and zinc in which no inorganic acid gases are evolved.

SUMMARY OF THE INVENTION

The above-described objects can be accomplished by the method described herein. A homogeneous mixed powder of zinc oxide and oxides of titanium derived from a titanic acid ester, such as tetrabutyl titanate or tetraisopropyl titanate, are heated at a temperature of 600°C or more.

DETAILED DESCRIPTION OF THE INVENTION

The titanic acid esters which can be used in this invention include tetrabutyl-titanate (T. B. T.), tetraisopropyl titanate (T. P. T.), tetrastearyl titanate (T. S. T.) and tetra(2-ethyl)-hexyl titanate.

The titanic acid esters may be represented by the general formula $Ti(OR)_4$ in which R is an alkyl group of from about three to about eight carbon atoms and are easily hydrolyzed by water or moist air.

The oxides of titanium obtained by hydrolysis of the titanic acid esters are known to be very fine and to have a high bulk density, and examples of the most common titanic acid esters are tetrabutyl titanate (T. B. T.) and tetraisopropyl titanate (T. P. T.). These esters are colorless liquids having a slight yellow color and are easily dissolved in organic solvents such as alcohols, ketones, esters, or aromatics. The hydrolysis of these titanic acid esters takes place when they are contacted with water in an organic solvent which is quite miscible with water, for example, methanol, ethanol, butanol or acetone, whereby the oxides of titanium formed are white in color.

In the method according to the present invention, zinc oxide is first dispersed in an organic solvent which is quite miscible with water to prepare a uniform dispersion. The zinc oxide is preferably prepared by the gas phase oxidation method (the so-called French method). The zinc oxide prepared by the gas phase oxidation method is superior in purity and crystallizability to that prepared using the wet-type method. Furthermore, oxides prepared by the gas phase oxidation method can be dispersed easily into alcohol, acetone or like solvents, indicating good wettability.

A suitable amount of the zinc oxide in the dispersion is approximately up to 300 g. per liter of the solvent used. However, when the amount is too much, the fluidity of the dispersion is lost, thereby making it difficult to carry out the subsequent hydrolysis uniformly in a homogeneous phase. For this reason, the amount of the zinc oxide used is preferably not more than 250 g. per liter of the solvent.

Next, into the dispersed system of zinc oxide and the organic solvent water is added in an equivalent amount relative to the amount of the titanic acid ester to be added thereinto later. Sufficient agitation is necessary in order to accomplish uniform distribution of the water in the dispersed system phase.

The zinc oxide and water may, of course, be mixed at the same time into the organic solvent.

Subsequently, an equivalent amount, relative to the amount of the water already added, of a titanic acid ester is added thereto to carry out the hydrolysis reaction. The hydrolysis reaction is preferably carried out after diluting the titanic acid ester with an organic solvent from a stand point of effecting the reaction uniformly in the dispersed phase. It is necessary in this hydrolysis reaction to sufficiently agitate and mix the reaction system. It appears to be extremely efficient to employ a combination of mechanical mixing and agitation using agitating blades with ultrasonic irradiation, in order to homogeneously effect the reaction.

The type of the resulting compound oxide of titanium and zinc varies with the zinc oxide-to-titanic acid ester ratio.

In addition, the order of the addition of reactants is immaterial and the titanic acid ester can be added to the water and vice versa.

In this way, a uniformly mixed fine powder consisting of the zinc oxide powder and the fine powder of the oxides of titanium produced upon hydrolysis of the titanic acid ester is obtained as a dispersed system in an organic solvent. From this dispersed system only the powder is separated for example, by means of filtration or centrifugation. The organic solvent still present in the powder obtained may be removed therefrom, although this drying process is not always necessary.

The resulting powder is then subjected to heat treatment at a given temperature e.g., 600°C and above for a given period of time using an electric furnace or any other suitable heating means. The upper limit of the heat treating temperature and the time of heating can vary. Generally, the temperature used will not be above 1,000°C and the time of heating generally is 2 hours or more. The solid phase reaction of the zinc oxide with the oxides of titanium is carried out by this treatment to give the compound oxides of titanium and zinc.

The resulting compound oxides vary with the mix ratio of zinc oxide to the titanic acid ester, but examples of the most readily obtainable compound oxides include $ZnTiO_3$ in which the titanium oxide-to-zinc oxide ratio is 1 : 1, and $Zn_2Ti_3O_8$ in which the ratio is 3 : 2.

One of the greatest advantages according to the present invention is that the compound oxides of titanium and zinc can be obtained at lower temperatures than could be used in prior art methods.

Furthermore, according to the present invention, a larger quantity of the mixed powder can be heat-treated at a time, in comparison with prior art methods, to carry out the solid phase reaction, thereby giving the compound oxides of titanium and zinc.

Still further, the compound oxides obtained by the present method are an even finer powder than that obtained by prior art methods.

An experiment was made in which a mixed powder of titanium oxide and zinc oxide was subjected to heat treatment under the same conditions, in order to provide a comparison of of the prior art method with the present method.

In the method according to the present invention, when the temperature was 600°C or more, the formation of compound oxides of titanium and zinc such as zinc metatitanate ($ZnTiO_3$), $Zn_2Ti_3O_8$ or $Zn_2TiO_4$ was detected by X-ray diffractiometry. While, when the mixed powder of the oxides was used under the same reaction conditions, the compound oxides were not formed until the temperature became at least 700°C. As can be seen from the above-described numerous literature reference, where the amount of the mixed powder to be reacted is as small as several grams and sufficient heat provided into the powder, the solid phase reaction rapidly takes place and the compound oxides appear to be formed even at temperatures lower than 700°C. However, when the amount of the powder to be reacted amounts to 10 g. to 100 g., which is the case in the present method, the reaction becomes difficult. It is a great advantage of the present invention to be able to subject a considerably large amount of the powder at one time to the solid phase reaction for a relatively short period of time.

In the present method, the sufficient heat-treatment time is from about 4 to about 5 hours. This period is even shorter than that used in prior art methods.

The above-described advantages according to the present invention are believed to be based, in part, on the fact that the oxides of titanium obtained by the hydrolysis of the titanic acid ester are quite fine and chemically active.

Furthermore, in the present method, the oxides of titanium are formed in the form of a uniform dispersion in an organic solvent in which zinc oxide also has been uniformly dispersed. Accordingly, it appears that there is obtained a mixed powder in which the zinc oxide and titanium oxide are uniformly mixed and distributed. Therefore, it is though that the solid phase reaction uniformly takes place in the powder layer at a very high velocity. With the mixed powders used in prior art methods, the particle size of the powder particles are larger than that of the powder according to the present invention, the number contact points of each particle therefore being decreased. On the contrary, the oxides of titanium are extremely fine, show no appearance of any peak in the X-ray diffractiometry and are amorphous in appearance. Accordingly, it is believed that the points where the oxides of titanium contact the zinc oxide are very large in number and the powder particles themselves have a high surface energy and are rich in their chemical activity, thereby markedly facilitating the proceeding of the solid phase reaction.

The use of such a titanium oxide powder and the uniformity in the mixed powder constitute one of the main characteristics of the present invention.

It is known that, when titania sol obtained by neutralization with aqueous ammonia is used as the starting material, in prior art processes the reactivity can be further enhanced, and it is believed that, as in the known case, a similar phenomenon should result in the present invention.

Both the titanium oxide and zinc oxide are well known as photoconductors, and it has been found that the compound oxides of titanium and zinc prepared according to the present invention are also phtoconductive.

Accordingly, their powder can be directly used as an electrographic light-sensitive layer or as any other photoconductive element.

In practice of the present invention, the molar ratio of the titanium to the zinc in the mixed fine powder should not deviate much from the ratio 3 : 2, 1 : 1, or 1 : 2, in order that the least possible amount of titanium oxide and zinc oxide may remain unreacted upon completion of the solid phase reaction.

Furthermore, it has been found that the above-described objects can be accomplished not only upon mixing the oxides of titanium (which are the products obtained upon the hydrolysis of a titanic acid ester) and zinc oxide both in the form of sol but also upon mixing them both in the form of dry powder.

The present invention will now be further illustrated by reference the following examples.

EXAMPLES 1 TO 5

Zinc oxide-methanol dispersed system

| Zinc Oxide | 200 g. |
|---|---|
| Methanol | 1,000 c.c. |
| Water | 50 c.c. |

The composition of the above described formulation was subjected to ultra sonic irradiation to prepare a uniformly dispersed system.

Into the resulting zinc oxide - methanol dispersed system a methanolic solution of tetrabutyl titanate (T. B. T.) consisting of

| T. B. T. | 850 g. and |
|---|---|
| Methanol | 600 c.c., | was added incrementally while this dispersed system of zinc oxide was agitated and subjected to ultra sonic irradiation.

The foregoing reactions were all carried out at room temperature.

Only the solvent was removed from the resulting uniformly dispersed system of zinc oxide — oxides of titanium — methanol using a centrifuge. The thus obtained paste was dried for a full day at a temperature of from 80° to 100°C. Butanol, as a reaction residue, could not be completely removed and was present to a slight extent in the dried powder. The molar ratio of zinc oxide to titanium oxide in this mixed powder was 1 : 1.

The mixed powder was then placed in a porcelain crucible and heat-treated in a muffle type electric furnace. The treatment time was about 4 hours. Different treatment temperatures of 500°C, 600°C, 700°C, 800°C or 900°C. were used with the weight of the powder being about 25 g. in every case.

For comparison, a mixed powder of zinc oxide and titanium oxide (1 : 1 molar ratio) (rutile type) was prepared in the following manner and heat-treated under the same conditions.

200 g. of zinc oxide was uniformly dispersed into 1,000 c.c. of methanol. Then, into the dispersion was added 200 g. of titanium oxide and 800 c.c. of butanol. From this dispersed system the solvent was removed using a centrifuge to prepare a paste which was dried to give a mixed powder. The mixed powder thus obtained was subjected to heat treatment under the same conditions as used in the above-described examples embodying the invention.

An X-ray diffraction analysis was made on the thus heat-treated powders, the products detected thereby being shown in the following table.

| | Heat Treatment Temperature (°C) | $TiO_2$ | $ZnO$ | $ZnTiO_3$ | $Zn_2TiO_4$ | $Zn_2Ti_3O_8$ |
|---|---|---|---|---|---|---|
| Example 1 | 500 | x | ∞ | x | x | x |
| Example 2 | 600 | 0 | ∞ | 0 | x | x |
| Example 3 | 700 | x | x | ∞ | x | 0 |
| Example 4 | 800 | x | x | ∞ | x | ∞ |
| Example 5 | 900 | x | x | ∞ | x | 0 |
| Comparative Example 1 | 500 | ∞ | ∞ | x | x | x |
| Comparative Example 2 | 600 | ∞ | ∞ | x | x | x |
| Comparative Example 3 | 700 | ∞ | ∞ | x | x | x |
| Comparative Example 4 | 800 | 0 | 0 | 0 | x | x |
| Comparative Example 5 | 900 | x | 0 | x | x | 0 |

Remarks x : No peaks shown in the X-ray diffraction chart.
0 : Peaks shown in the X-ray diffraction chart.
∞ : Large peaks shown in the X-ray diffraction chart.

In the heat treatment, the amount of the sample was 80 g. in every case.

With the present method, the formation of the compound oxide ($ZnTiO_3$) (see Example 2) can be detected, and as the temperature increases in sequence (Example 3, 4 and 5), the peak in the X-ray diffraction chart corresponding to $ZnTiO_3$ increases with the peaks of $ZnO$ and $TiO_2$ disappearing.

While, in the comparative examples where the reaction was carried out under the same conditions as in the examples embodying the invention, no formation of compound oxides was detected until 800°C. Only two peaks, that is, the peak of $ZnTiO_3$ in Comparactive Example 4 and that of $Zn_2Ti_3O_8$ in Comparative Example 5, were detected.

As is evident from the foregoing Examples and Comparative Examples, the method according to the present invention is improved considerably in comparison with the prior art methods in that quantities of compound oxides of zinc and titanium can be prepared at relatively low temperatures.

All of the heat-treaded powder in Example 1 – 5 are even finer than the powders obtained in any of Comparative Examples 1 – 5.

| Example 6 | |
|---|---|
| Zinc Oxide | 100 g. |
| Methanol | 500 c.c. |
| Water | 25 c.c. |

A uniformly dispersed system of the above-described formulation was prepared. Into the dispersed system was added a methanolic solution of tetraisopropyl titanate (T. P. T.) consisting of

| T. P. T. | 525 g. and |
|---|---|
| Methanol | 400 c.c. |

After processing the dispersed system in the same manner as described in Examples 1 – 5, there was obtained a uniformly mixed fine powder with a mix ratio of 2 : 3, as a zinc oxide-to-titanium oxide molar ratio.

Heat treatment at 800°C for 3 hours gave $Zn_2Ti_3O_8$.

This invention has been described in considerable detail with particular reference to preferred embodiments thereof, but it will be understood that variations and modifications can be effected within the spirit and scope of the invention as described hereinabove and as defined in the appended claims.

What is claimed is:

1. A method for preparing zinc titanates selected from the group consisting of $ZnTiO_3$ and $Zn_2Ti_3O_8$ and mixtures thereof comprising:
   1. preparing a uniform dispersion of zinc oxide and a titanic acid alkyl ester in a water miscible organic solvent containing an amount of water sufficient to hydrolyze said ester to the corresponding titanium oxide, thereby producing a mixture of solid powders of zinc oxide and titanium oxide in said solvent,
   2. substantially separating said zinc and titanium oxide from said solvent and
   3. heating said mixed solid powders of zinc oxide and titanium oxide at a temperature of at least 600°C until said zinc titanates have been formed.

2. The method of preparing compound oxides of titanium and zinc as claimed in claim 1, wherein said titanic acid alkyl ester is tetrabutyl titanate or tetraisopropyl titanate.

3. The method of preparing compound oxides of titanium and zinc as claimed in claim 1, wherein said zinc oxide is obtained by the gas phase oxidation method.

4. The method of preparing compound oxides of titanium and zinc as claimed in claim 1, wherein the ratio of the oxides of titanium to zinc oxide in said mixed solid powder ranges from 3 : 2 to 1 : 2, based on the molar ratio of titanium to zinc.

5. The method of preparing compound oxides of titanium and zinc as claimed in claim 1, wherein the mixed fine powder of the oxides of titanium and zinc oxide is in the form of a sol.

6. The method of preparing compound oxides of titanium and zinc as claimed in claim 1, wherein said water-miscible solvent is methanol, ethanol, acetone or mixtures thereof.

7. The method for preparing compound oxides of titanium and zinc of claim 1, wherein said zinc oxide is present in said solvent at a level of up to about 300 g/l of said solvent.

8. The method for preparing compound oxides of titanium and zinc of claim 1, wherein said water is present at a level substantially equal on an equivalents basis to the amount of said titanic acid alkyl ester.

* * * * *